United States Patent [19]

Lentz et al.

[11] Patent Number: 5,216,606

[45] Date of Patent: Jun. 1, 1993

[54] COMPENSATED CONTROL METHOD FOR FILLING A FLUID-OPERATED AUTOMATIC TRANSMISSION CLUTCH

[75] Inventors: Carl A. Lentz, Mooresville; Charles F. Long, Indianapolis, both of Ind.

[73] Assignee: General Motors Corporation, Detroit, Mich.

[21] Appl. No.: 642,752

[22] Filed: Jan. 18, 1991

Related U.S. Application Data

[63] Continuation-in-part of Ser. No. 456,428, Dec. 26, 1989, abandoned.

[51] Int. Cl.$^5$ .............................................. B60K 41/00
[52] U.S. Cl. .................................. 364/424.1; 74/866
[58] Field of Search ............... 364/424.1; 74/892, 844, 74/856, 859, 864, 866, 867

[56] References Cited

U.S. PATENT DOCUMENTS

| | | | |
|---|---|---|---|
| 4,671,139 | 6/1987 | Downs et al. | 74/866 |
| 4,706,522 | 11/1987 | Nitz | 74/866 |
| 4,707,789 | 11/1987 | Downs et al. | 364/424.1 |
| 4,913,004 | 3/1990 | Panoushek et al. | 364/424.1 X |
| 4,951,200 | 8/1990 | Leising et al. | 364/424.1 |
| 5,079,970 | 1/1992 | Butts et al. | 74/867 X |
| 5,113,720 | 5/1992 | Asayama et al. | 74/866 |

Primary Examiner—Parshotam S. Lall
Assistant Examiner—Thomas S. Auchterlonie
Attorney, Agent, or Firm—Mark A. Navarre

[57] ABSTRACT

The on-coming clutch of an automatic transmission is filled for a fill time determined from empirical data embodied in look-up tables which relate the effects of pump speed and fluid temperature on the fill time. The fill time is determined for a baseline clutch and then multiplied by a volume ratio for a particular clutch. The effect of fluid temperature on leakage is tabulated and used with the pump speed to determine the effective pumping speed. The effects of fluid temperature on viscosity and oil flow rate are determined and used to adjust the base fill time for low pumping speeds. The fluid retained in a clutch cavity from a recent application and not fully exhausted is also taken into account.

7 Claims, 9 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

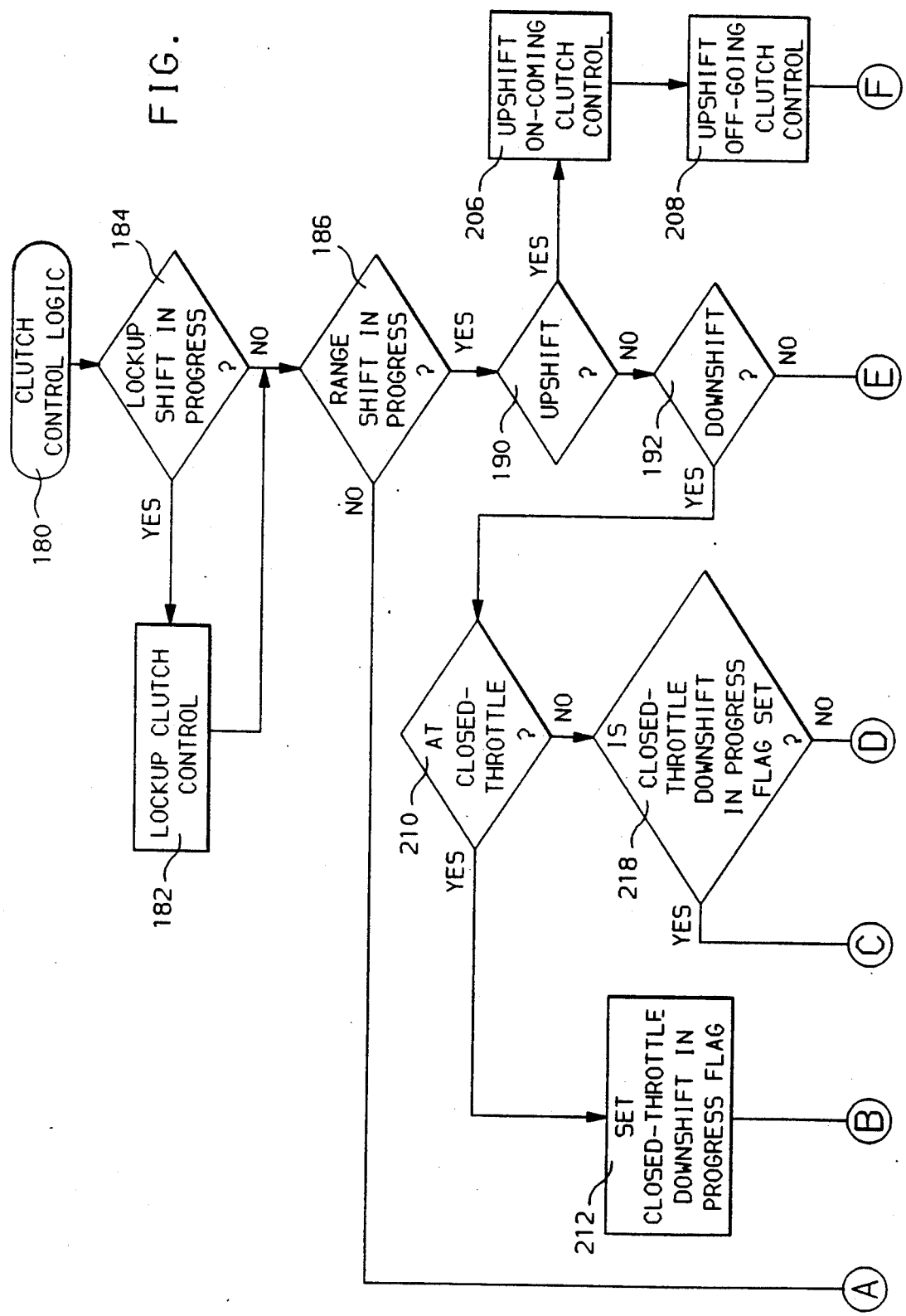

COMPENSATED CONTROL METHOD FOR FILLING A FLUID-OPERATED AUTOMATIC TRANSMISSION CLUTCH

This is a continuation-in-part of U.S. Ser. No. 07/456,428, filed Dec. 26, 1989, now abandoned.

FIELD OF THE INVENTION

This invention relates to the filling of an on-coming transmission clutch or brake in preparation for its engagement.

BACKGROUND OF THE INVENTION

Generally, a motor vehicle automatic transmission includes a number of gear elements coupling its input and output shafts and a related number of torque establishing devices, such as clutches and brakes, which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio, and engaging a clutch associated with the lower speed ratio to thereby reconfigure the gear set to operate at the lower speed ratio. Shifts performed in the above manner are termed clutch-to-clutch shifts and require precise timing in order to achieve high quality shifting. For an on-coming clutch, the fill time required to achieve torque carrying capacity is a variable depending mainly on the size of the clutch fill volume, the fluid pump speed, the fluid viscosity and the fluid temperature. It is important to know when, after fill initiation, to expect the clutch to assume torque capacity in order to time other shift commands.

SUMMARY OF THE INVENTION

It is therefore an object of the invention to provide an improved control method for filling an on-coming clutch of an electronically controlled transmission.

It is another object to provide such a control method which takes into account varying pump speed, fluid viscosity, fluid temperature and clutch volume.

According to this invention, the clutch is supplied with fluid for a fill time which is determined as a combined function of a base fill time, the volume ratio of the on-coming clutch, the temperature of the transmission fluid and the time since the on-coming clutch was last exhausted. The base fill time is determined as a function of the effective pump speed, which in turn, is determined as a function of the measured pump speed, the fluid temperature and an adaptive determined viscosity offset. The viscosity offset is updated during certain garage shifts, and compensates the effective pump speed for variations in the characteristics of the transmission fluid.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a-3e are flow diagrams representative of computer program instructions executed by the computer-based controller of FIG. 1a in carrying out the control method of this invention.

DETAILED DESCRIPTION OF THE INVENTION

Figure 1A:
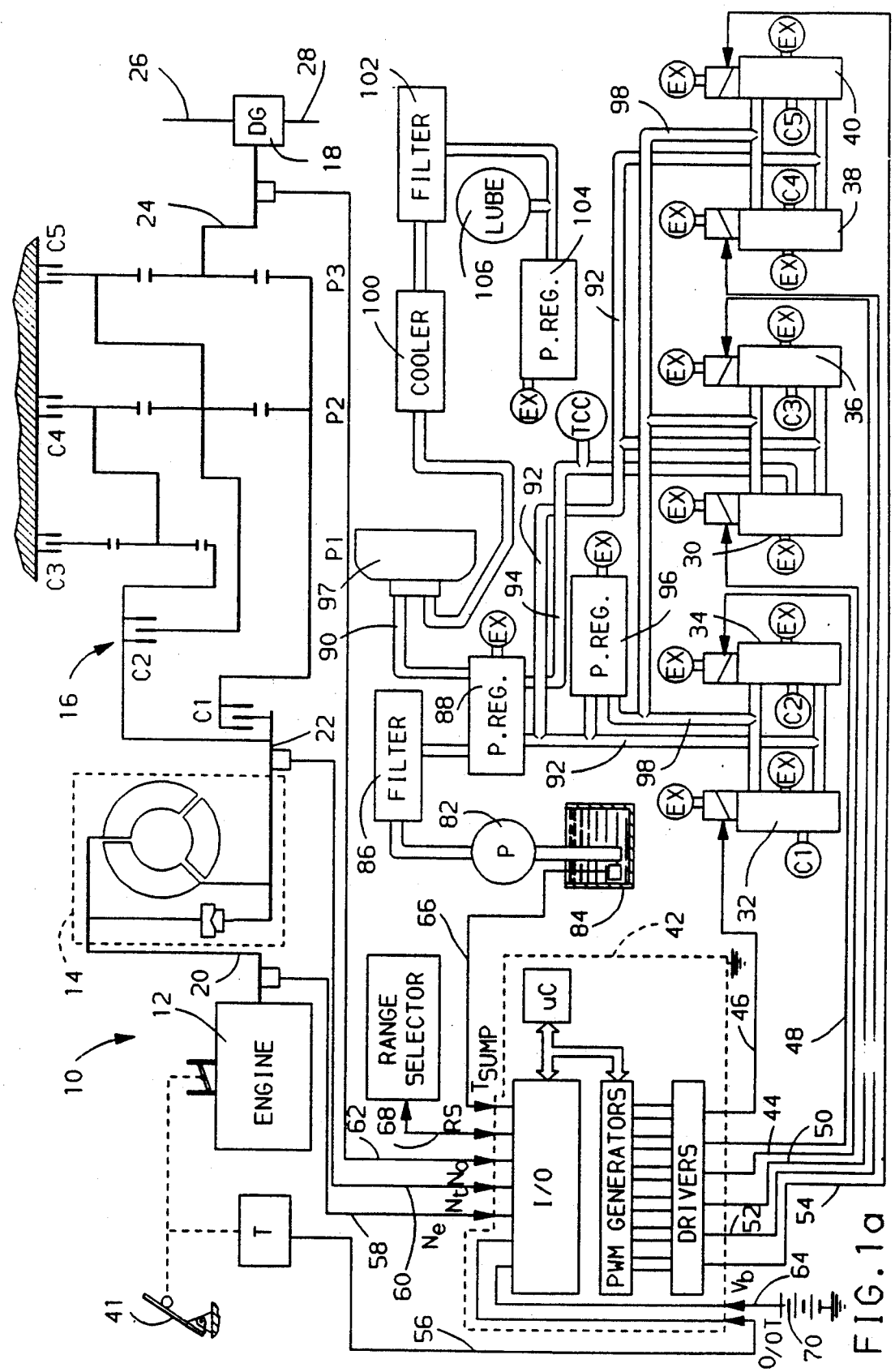
FIG. 1a is a system diagram of a fluid operated motor vehicle transmission, including several solenoid operated fluid pressure control valves and a computer-based control unit for carrying out the control method of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

The speed and torque relationships between the engine 12 and the drive wheels of the vehicle are controlled by a fluid operated torque converter clutch, designated TCC, and five fluid operated transmission clutches, designated C1–C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40, according to the diagram shown in FIG. 1b, to selectively establish a desired transmission speed ratio. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66, and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determines the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 driven by the engine at engine speed Ne for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
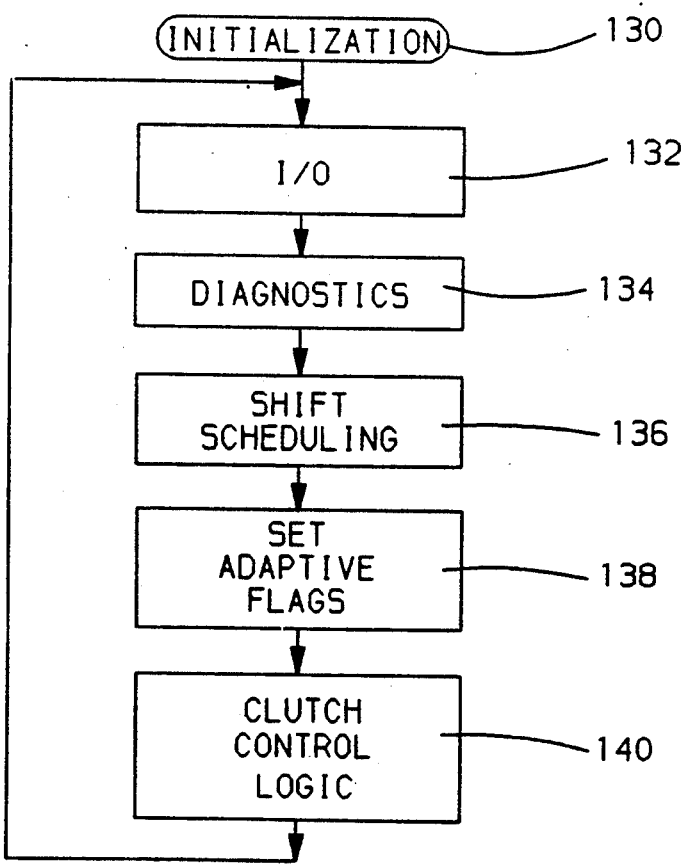

FIGS. 2 and 3a-3e are flow diagrams representative of computer program instructions executed by the computer-based control unit 42 of FIG. 1 in carrying out the control method of this invention.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40, and block 134 contains diagnostic routines. Block 136 is directed to shift scheduling, and is set forth in further detail in the flow diagram of FIGS. 3a-3b. Block 138 updates the various flags used in the adaptive controls. Block 140 is directed to the clutch control logic, and is set forth in further detail in the flow diagrams of FIGS. 3c-3e. In general, the clutch control block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations.

Figure 3A:
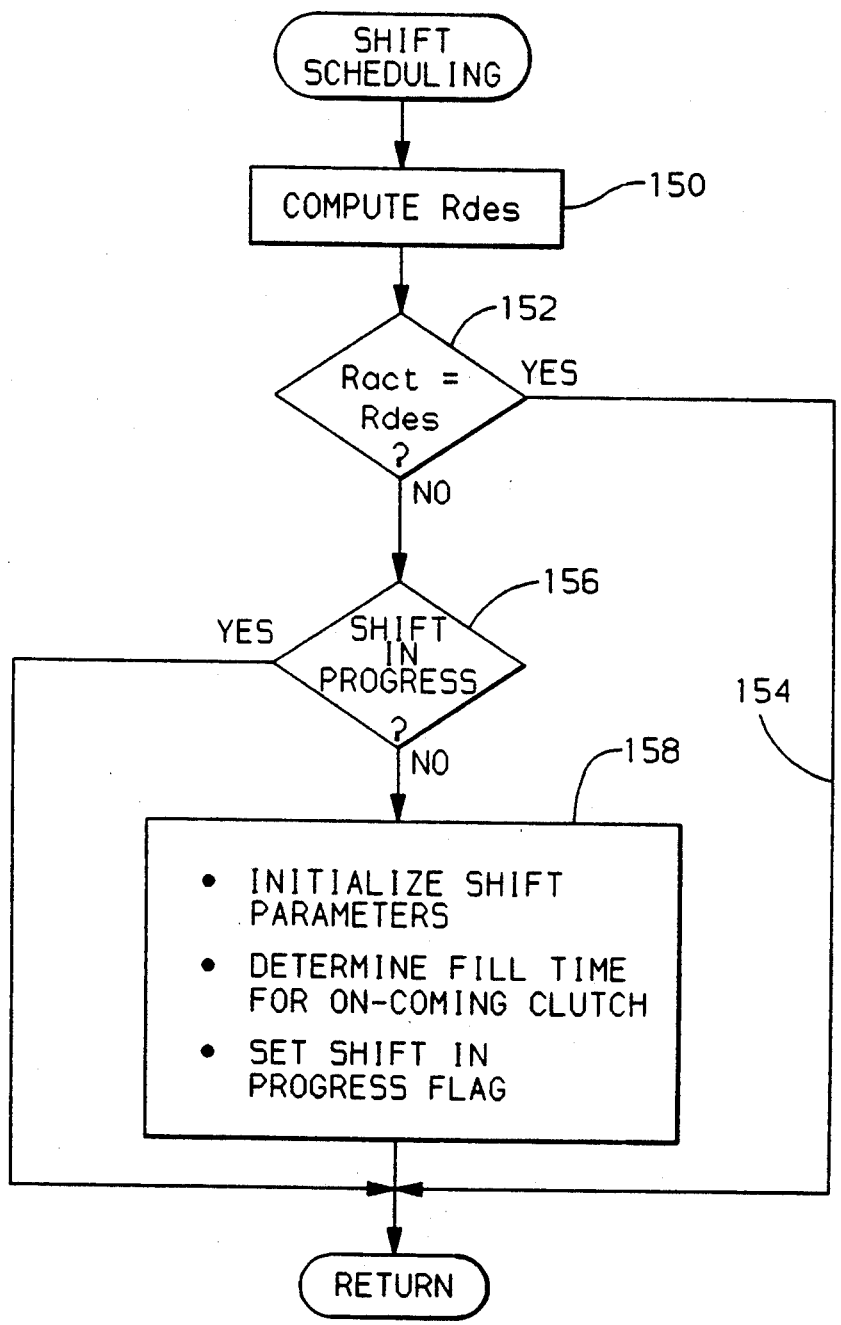

Referring to the shift scheduling logic of FIGS. 3a-eb, the desired speed ratio Rdes is first determined <150> as a function of output speed No, throttle position %T and the range selector input RS. If the actual ratio Ract (that is, Nt/No) is equal to the desired ration Rdes <152>, the remainder of the routine is skipped, as indicated by the flow diagram line 154. If the actual ratio Ract is not equal to the desired ratio Rdes <152>, and a shift is not yet in progress <156>, the control unit 42 initializes the shift parameters, determines the fill time for the on-coming clutch of the shift, and sets a SHIFT IN PROGRESS flag <158>.

Figure 3B:
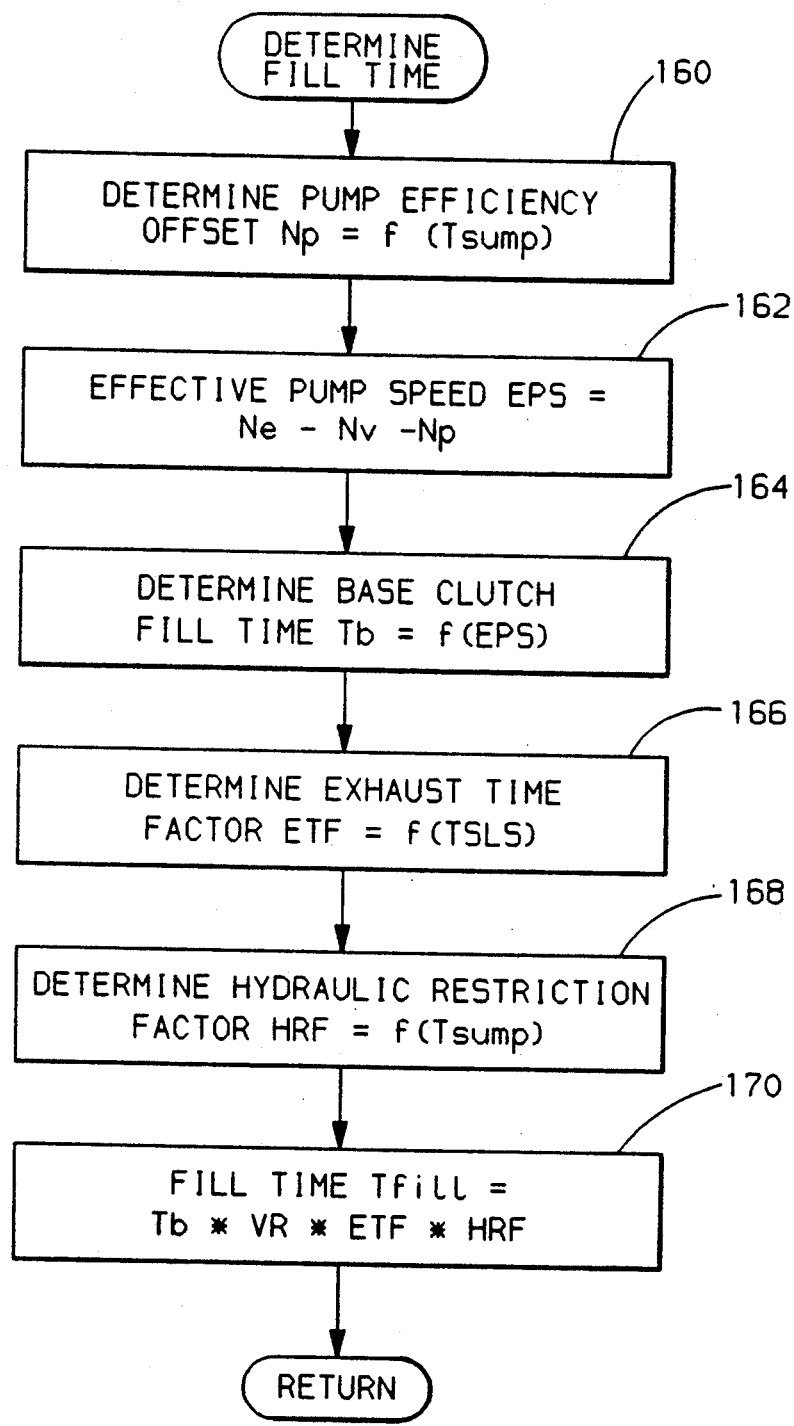

The flow diagram of FIG. 3b details the determination of the on-coming clutch fill time, referenced in block 156 of FIG. 3a. The shift quality of a control) based on calibrated or preset times is often dependent on reliable estimation of the fill time of an on-coming clutch. Fill time is the time required to fill a clutch cavity, with oil. During the fill period the clutch piston stpokes and the clutch plates compress. No significant clutch capacity can occur until this compression is complete. Hence, it is very important for proper clutch control during range shifting of an automatic transmission to be able to accurately predetermine the length of the fill period. Underestimation of the fill period results in little or no clutch capacity when clutch application is required; overestimation of the fill period results in excessive clutch pressure being applied. The subject control method has been developed to accurately determine the required fill time.

Since the time required to fill a cavity is directly proportional to the cavity volume and the various clutches may have different cavity sizes, it has been found to be convenient to calculate a base fill time Tb on the basis of a baseline clutch fill volume, assuming that the clutches are filled at 100% pressure, and then convert the base fill time to each actual clutch fill time by a proportional factor called volume ratio VR. Thus, the physical cavity sizes relative to the baseline clutch determine the volume ratios. Adaptive corrections of the fill time, such as set forth in the U.S. Pat. No. 5,072,390, issued Dec. 10, 1991, and assigned to the assignee of the present invention, may be applied to the volume ratio.

Figure 4:
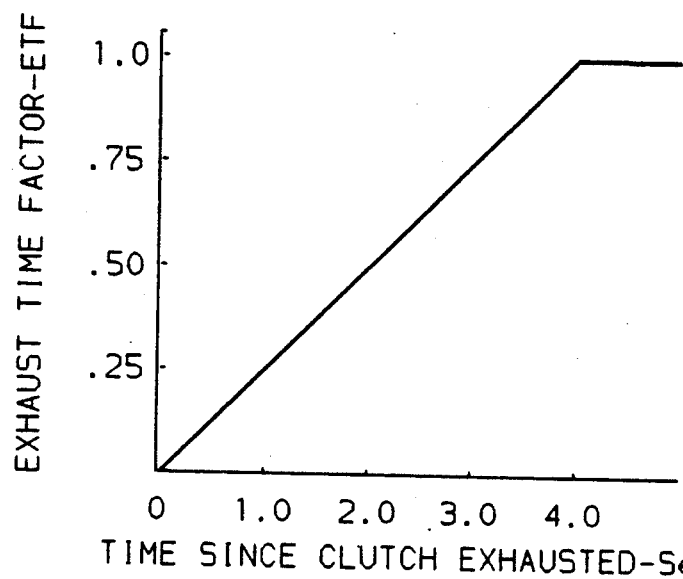
FIG. 4 is a graph of the tabulated relationship of exhaust time factor versus the time since the clutch was exhausted.

The base fill time is modified by a pair of factors, referred to herein as the Exhaust Time Factor ETF and the Hydraulic Restriction Factor HRF. The ETF factor accounts for the presence of fluid retained in a clutch cavity from a previous apply period by approximating the percentage of clutch capacity or empty cavity space. The factor ETF varies as a function of the time since an exhaust command for the respective clutch, as illustrated in the graph of FIG. 4. While the function is shown as linear, this is not necessarily the case.

Figure 7:
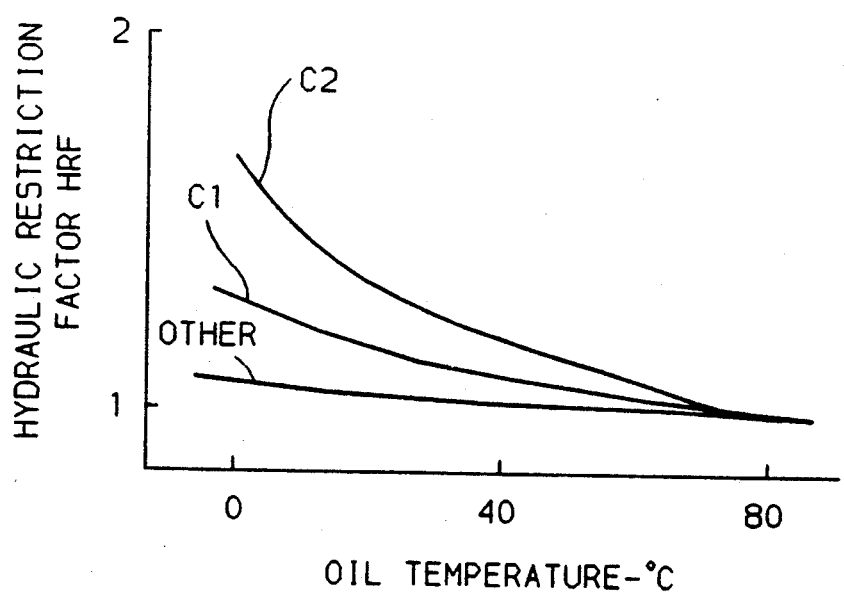
FIG. 7 is a graph of the tabulated relationship of a fluid restriction factor versus oil temperature.

The hydraulic restriction factor HRF takes into account the temperature effect on oil viscosity. This becomes important at low temperatures, especially for clutches having relatively long narrow passages through which the transmission fluid must pass. FIG. 7 shows a typical hydraulic restriction factor HRF characteristic versus sump temperature Tsump. The factor HRF has a base value of unity and increases with increasing effect on fill time. In the illustrated embodiment, clutches C1 and C2 have relatively long drilled fluid passages and the factor HRF increases significantly with decreasing fluid temperatures. The other clutch passages are not similarly restricted and the factor HRF increases only slightly with decreasing fluid temperature.

The fill time for a given clutch is thus determined as the product of the base fill time Tb, the volume ratio VR, the exhaust time factor ETF and the hydraulic restriction factor HRF. The Base Fill Time, in turn, varies according to pump speed, the characteristics of the transmission fluid and the fluid temperature. Low pump speed can limit the available flow of fluid and hence the time of clutch fill. The fluid characteristics and temperature vary the amount of fluid leakage and therefore the pump efficiency.

Figure 5:
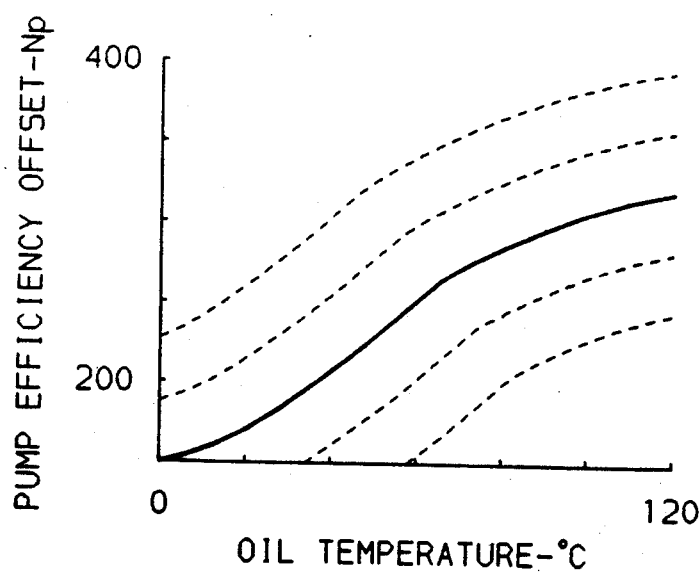
FIG. 5 is a graph of the tabulated relationship of a pump efficiency offset versus oil temperature.

The effect of leakage as a function of temperature is determined empirically. The control of this invention compensates for the leakage effect by determining a pump efficiency offset speed Np, and reducing the measured pump speed by the offset Np to form an effective pump speed EPS. The offset Np is typically nonlinear and varies depending on the weight and operating characteristics of the fluid used in the transmission. The solid trace in FIG. 5 represents the offset Np for the fluid normally recommended by transmission manufacturers. The various broken lines represent the offset Np when different weight transmission fluids are used. An important aspect of the present invention involves the generation of a viscosity offset Nv, which when combined with the measured pump speed and the offset Np, ensures that the appropriate efficiency offset is used. According to this invention, the viscosity offset Nv is adaptively updated in the course of each Reverse-to-Drive (R-D) and Neutral-to-Drive (N-D) garage shift of the transmission, the actual control method being detailed below in reference to the flow diagram of FIG. 3e.

Figure 6:
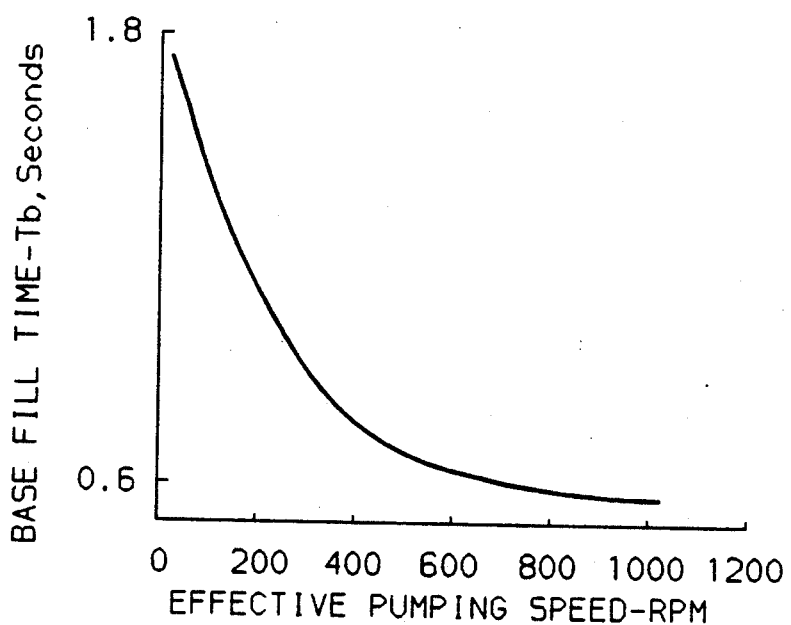
FIG. 6 is a graph of the tabulated relationship of base fill time versus effective pumping speed.

The relationship between base fill time Tb and effective pump speed EPS is determined empirically and is shown in FIG. 6 for a typical clutch. It can be seen that at relatively low speeds, the base fill time Tb changes dramatically with effective pumping speed EPS. At effective pumping speeds above a predetermined value Nmax, such as 1000 RPM, the base fill time Tb becomes nearly constant.

Referring to the flow diagram of FIG. 3b, the control unit 42 thus determines the pump efficiency offset Np as a function of the fluid temperature Tsump <160>; computes effective pump speed EPS according to the measured pump speed (engine speed Ne) less the efficiency offset Np less the viscosity offset Nv <162>; determines the base fill time Tb as a function of the effective pump speed EPS <164>; determines the exhaust time factor ETF as a function of the time since the last shift <166>; determines the hydraulic restriction factor HRF as a function of the fluid temperature Tsump <168>; and computes the fill time Tfill according to the product of Tb, VR, ETF and HRF <170>. Each of the empirically determined relationships illustrated in FIGS. 4 through 7, as well as the volume ratio for each clutch, are stored in the form of look-up tables and thus are convenient for rapid calculation of the fill time.

As indicated above, the viscosity offset Nv used in the computation of the effective pump speed EPS is adaptively updated in the course of certain garage shifts of the transmission. This portion of the control lies within the clutch control logic referenced in block 140 of FIG. 2 and is set forth in further detail in the flow diagram of FIGS. 3c–3d. Such flow diagram also sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <182> if a lockup shift is in progress <184>. Then it is determined (from the shift schedule) whether a range shift is in progress <186>. If not, the clutch control logic is exited. If a range shift is in progress <186>, it is determined whether it is an upshift <190>, a downshift <192>, a neutral shift <194> or a garage shift <196>. Garage shifts generally include shifts from neutral to either drive or reverse, from drive to reverse and from reverse to drive.

The control flow from either the upshift, downshift, neutral shift or the garage shift block to the end-of-shift test <200>. Once the shift is completed <202>, adaptive shift parameters are changed if required <202> and the duty cycle command is output <204>. If the shift has not ended <200>, the duty cycle command is output <204> before returning to the main loop of FIG. 2.

If an upshift is indicated <190>, the upshift on-coming clutch control <206> and the upshift off-going clutch control <208> are activated. If a downshift is indicated <192>, it is next decided whether it is a closed throttle downshift or a powered downshift <210>. If it is closed throttle, a closed throttle in progress flag is set <212>, the closed throttle on-coming clutch control is activated <214> and the closed throttle off-going clutch control is activated <216>. If the downshift is not at closed throttle <210>, the closed throttle flag is checked <218>. If the flag is not set, the powered downshift on-coming clutch control <220> and the powered downshift off-going clutch control <222> are activated. If the closed throttle flag is set <218>, the throttle opened during the course of the closed throttle downshift and a transition to powered downshift may be necessary; in such case, the appropriate transition logic is invoked <224>. If the shift is a neutral shift <194>, the neutral shift clutch control executes shifts from drive to neutral or from reverse to neutral <226>.

Each control phase operates by setting pressures, pressure increments, times or other values to carry out the scheduled shift. In regard to the present invention, each control phase involving the engagement of an on-coming clutch includes a fill phase during which fluid is supplied to the on-coming clutch for the fill time determined in the above-described shift scheduling routine, followed by a completion phase during which the actual engagement occurs. A detailed description of an exemplary on-coming clutch control for employing the fill time according to this invention is set forth in the above-referenced U.S. Pat. No. 4,072,390.

Figure 3D:
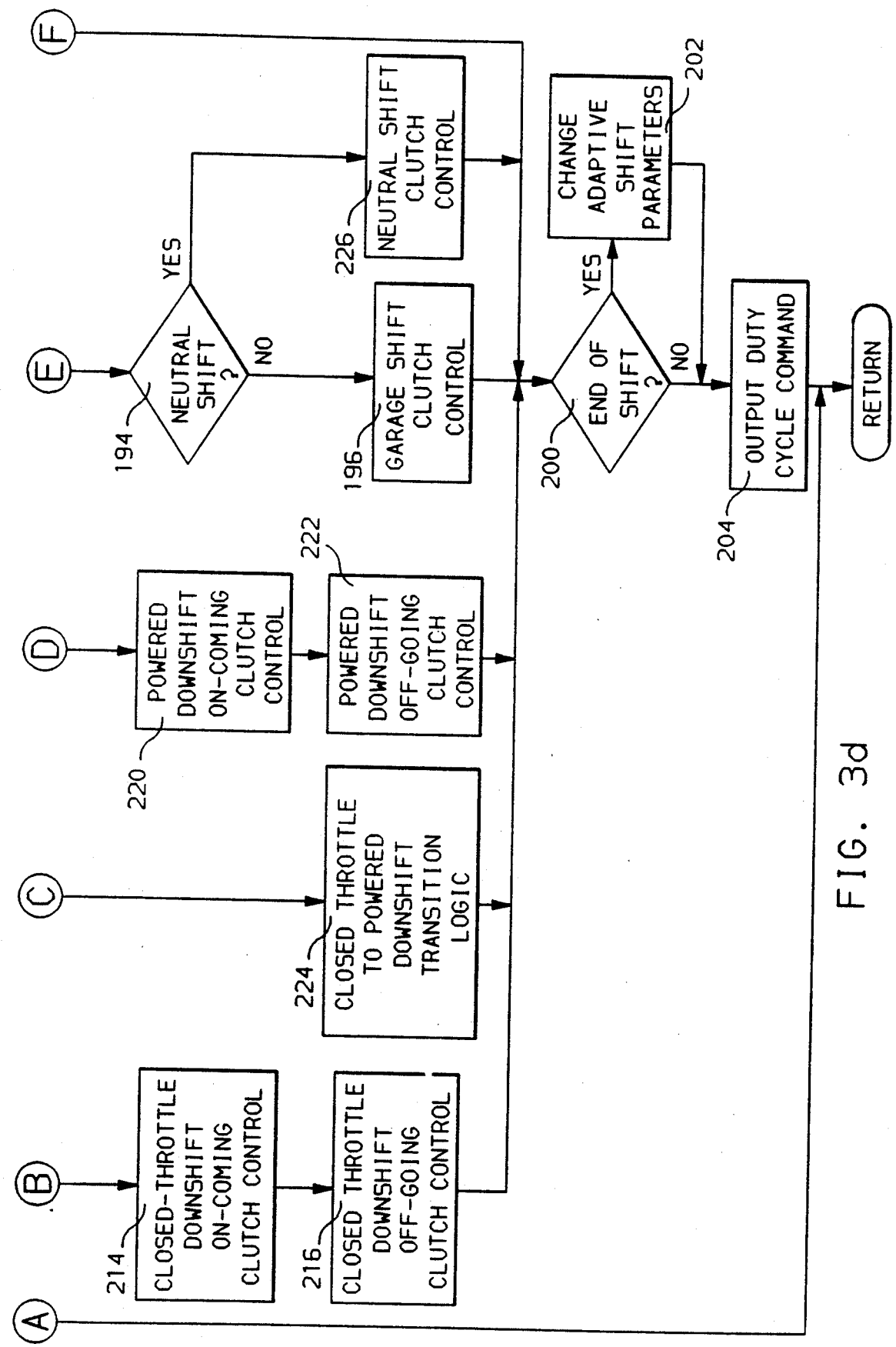
Figure 3E:
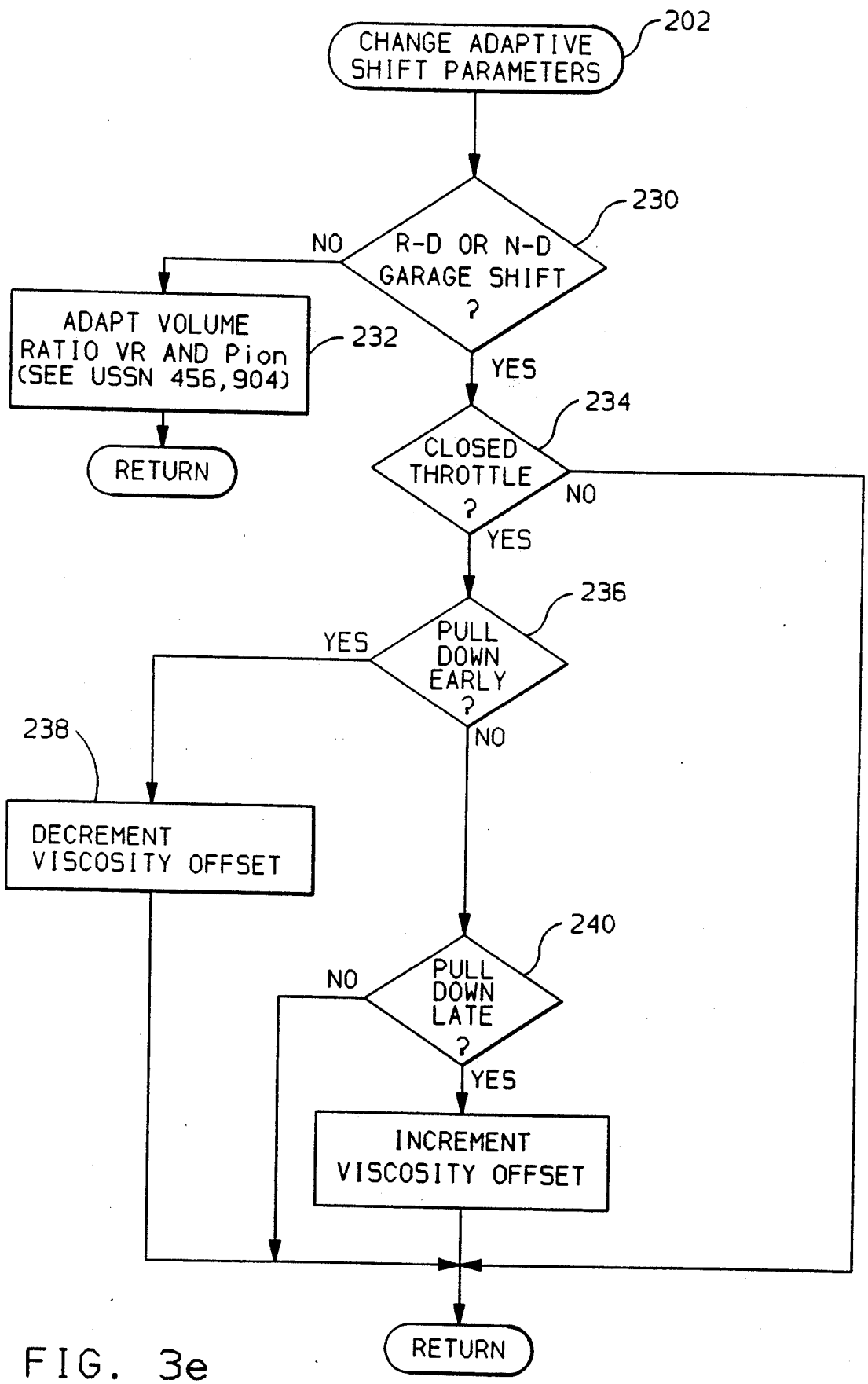

The change adaptive shift parameters function referenced at block 202 of FIG. 3d is set forth in further detail in the flow diagram of FIG. 3e, particularly in reference to the adaptive updating of the viscosity offset Nv. If the shift was other than a R-D or N-D garage shift <230>, the control unit 42 performs adaptive corrections of the respective volume ratio VR and initial on-coming clutch pressure Pion. Further detail in respect to these controls is set forth in the above-referenced U.S. Pat. No. 5,072,390.

If the shift was a R-D or N-D garage shift <230>, the engine throttle is closed <234> and there was an early pulldown of the turbine speed Nt <236>, the viscosity offset Nv is decremented <240>. The early pulldown, closed throttle condition indicates an overfill condition (Tfill too long), but since the volume ratio VR has already been adaptively corrected during normal range shifting to compensate for fill time variations, a variation in the fluid viscosity is assumed. As indicated above, such variation may be due to the use of a different weight fluid than that recommended by the manufacturer, or changes in the characteristics of the recommended weight oil. In such case, the reduction of the viscosity offset Nv serves to increase the effective pump speed EPS, thereby decreasing the base fill time Tb, especially at low pump speeds. The opposite condition is indicated by a late pulldown of the turbine speed Nt <238>, in which case the viscosity offset Nv is incremented, thereby decreasing the effective pump speed EPS and increasing the base fill time Tb.

Exemplary early and late pulldown detection routines are set forth in the above-referenced U.S. Pat. No. 5,072,390.

In the above manner, the viscosity offset is adaptively updated at each R-D and N-D garage shift to adjust the fill time for variations in the viscosity of the transmission fluid. With the illustrated embodiment, the adaptive updating is performed at R-D and N-D garage shifts, in particular, because both types of shift involve engagement of a clutch (C1) which is also engaged in high speed shifting. Since the volume ratio of the C1 clutch is adaptively corrected in high speed 5-4 downshifting (where oil viscosity variation is not significant), it can be assumed that early or late pulldowns during R-D or N-D garage shifting indicate the need for a change in the viscosity offset Nv. In theory, adjustments to the viscosity offset could also or alternatively be determined in relation to the C3 clutch during D-R or N-R garage shifts, since the C3 clutch is also engaged during high speed 2-3 and 4-5 upshifts. A factor in selecting the appropriate clutch for a given transmission is the relative volume of the clutch, since in a digital system, the fill accuracy increases with fill time.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a vehicular automatic shift transmission including a pump driven at a variable speed for developing fluid pressure and a fluid-operated torque transmitting device which is filled with fluid in preparation for engagement in response to issuance of a shift command, a control method for filling said torque transmitting device comprising the steps of:
   determining an effective pumping speed as a function of transmission fluid temperature and a sensed pump speed;
   determining a fill time according to the product of a volume ratio factor for said torque transmitting device and a base fill time determined as a function of said effective pumping speed from a table of empirically derived base fill time values; and
   supplying the fluid pressure developed by said pump to said torque transmitting device for said determined fill time.

2. The control method as defined in claim 1 wherein the effective pumping speed is determined by offsetting the sensed pump speed by a fluid temperature dependent leakage offset term.

3. The control method as defined in claim 1 wherein the step of determining the fill time includes the steps of:
   determining a fluid temperature dependent hydraulic restriction factor for the torque transmitting device; and
   determining said fill time according to the product of said volume ratio factor, said base fill time and said hydraulic restriction factor.

4. The control method as defined in claim 1 wherein the fill time depends on an initial condition of the device due to being only partially exhausted at the issuance of said shift command, and wherein the step of determining the fill time includes the further step of:
   measuring the time elapsed between the last pressure exhaust command and the issuance of said fill command,
   determining the percentage of device capacity as a predetermined function of such measured time; and
   determining the fill time according to the product of base fill time, the volume ratio factor, and the percentage of device capacity.

5. In a vehicular automatic shift transmission including a pump driven at a variable speed for developing fluid pressure and a fluid-operated torque transmitting device which is filled with fluid prior to engagement in response to issuance of a shift command, a control method for filling said torque transmitting device comprising the steps of:
   determining an effective pumping speed as a function of a sensed pump speed, a transmission fluid temperature dependent leakage offset and an adaptively updated viscosity offset;
   determining a fill time according to the product of a volume ratio factor for said torque transmitting device and a base fill time determined as a function of said effective pumping speed form a table of empirically derived base fill time values; and supplying the fluid pressure developed by said pump to said torque transmitting device for said determined fill time.

6. The control method set forth in claim 5, wherein the transmission includes a driven input shaft connected to said torque transmitting device, and the adaptive updating of said viscosity offset term includes the steps of:

adjusting the viscosity offset term in a direction to increase the effective pumping speed in subsequent fill time determinations in response to an early pulldown of the transmission input shaft due to engagement of the torque transmitting device; and adjusting the viscosity offset term in a direction to decrease the effective pumping speed in subsequent fill time determinations in response to a late pulldown of the transmission input shaft due to engagement of the torque transmitting device.

7. The control method set forth in claim 5, including the steps of:

adaptively adjusting said fill time during shifting at pump speeds for which fluid viscosity variations do not significantly affect fill time; and adaptively adjusting said viscosity offset term during shifting at pump speeds for which fluid viscosity variations do significantly affect fill time.

* * * * *